Nov. 6, 1956 R. W. BROMLEY 2,769,426
PARAKEET SHELTER
Filed June 13, 1955
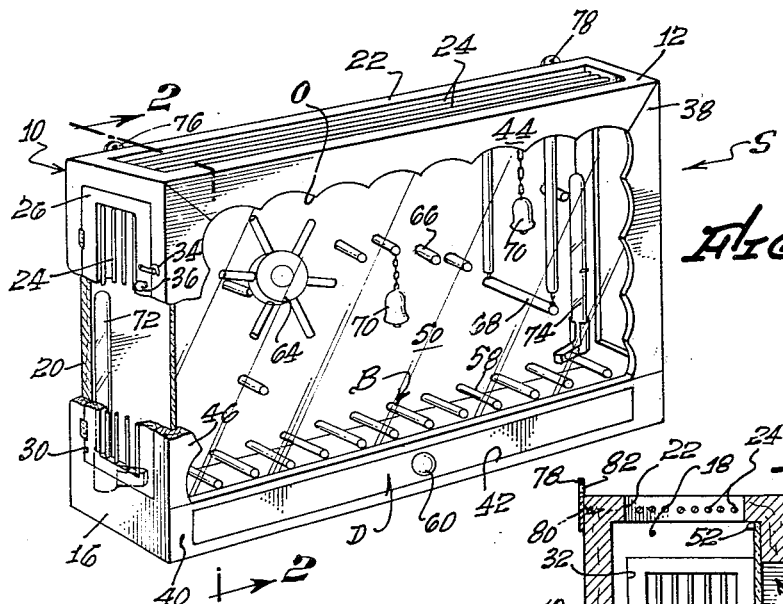
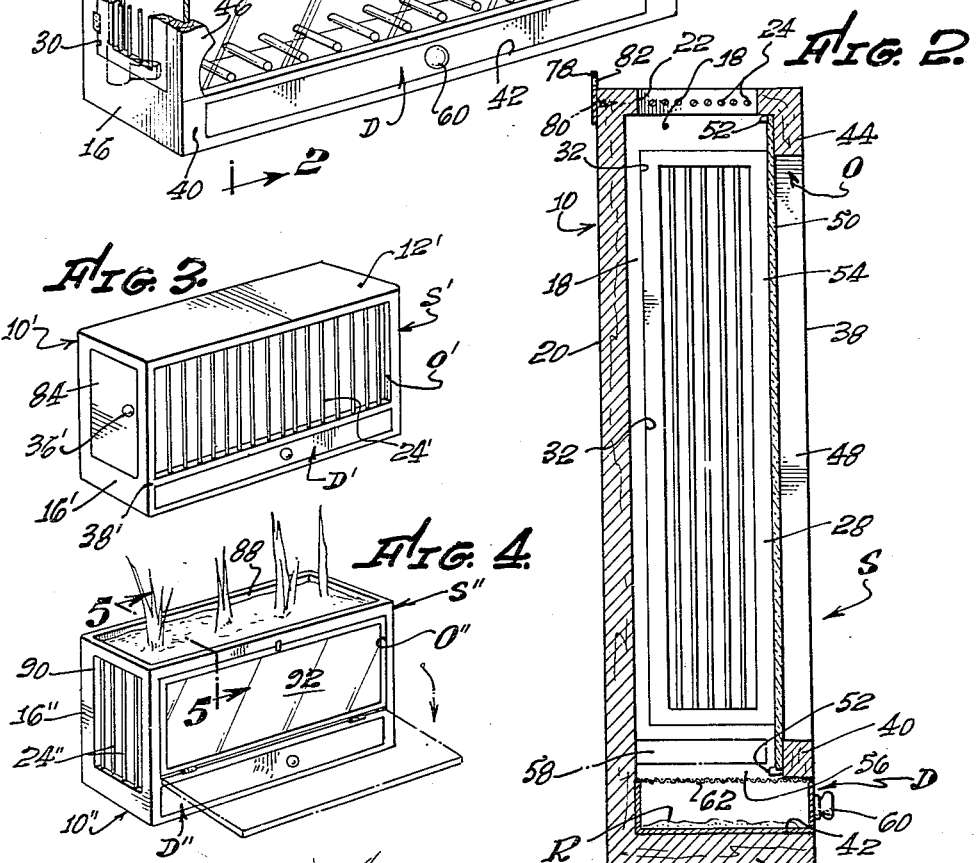
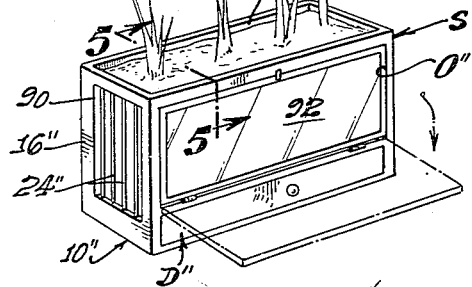
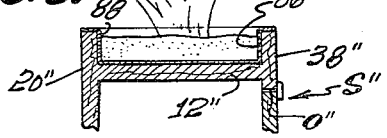
INVENTOR.
RUSSELL W. BROMLEY,
BY
William C. Babcock
ATTORNEY.

2,769,426
PARAKEET SHELTER

Russell W. Bromley, Long Beach, Calif.

Application June 13, 1955, Serial No. 515,070

6 Claims. (Cl. 119—17)

The present invention relates generally to bird shelters or perches and particularly to a new wall supported enclosure on the order of a parakeet or canary cage or perch that is easily maintained in a sanitary condition.

Bird cages and the like have traditionally been wire enclosures or perches hung from the ceiling of a room or supported on the floor by means of standards. Such devices have been lightly constructed and hence fragile in order to be easily transported to some other place for cleaning or other purposes as well as being so constructed to provide an unobstructed view and ventilation through the cage. In any case, these devices have not been easily maintainable in a sanitary condition as no provision has been made therein to prevent access of the birds to the floor of the shelter, the floor also being the receptacle for bird droppings, crumbs, seeds, water and like debris. The contact of the bird with the debris has unfortunate consequences for both the bird and its owner since it is not healthy for the bird. Contact of the bird with such debris permits the bird to dispense it at random both in and out of the cage and the cage and surrounding area are accordingly not maintainable in a sanitary condition.

It is among the primary objectives of the present invention to provide a bird shelter having means to prevent a bird housed therein from having contact with debris collected therein.

Another important objective of the invention is to provide a bird shelter that is easily maintainable in a sanitary condition and that will at all times prevent the falling therefrom of any debris.

It is also an object of the invention to provide a device of this character that by virtue of the ease of its maintenance in a sanitary condition may be hung from the wall of any room of the house, without any danger of dirt produced by the bird housed therein being dispersed by the bird onto the floor of such room.

Another object of the invention is to provide a wall supported bird shelter that may be easily fabricated from any of a wide variety of economical materials so as to be marketable at a moderate cost.

A further object of the invention is to supply a bird shelter that can be supported from a wall, provides maximum flying space for the birds contained therein, and occupies a minimum of living space in the room in which it is disposed.

Yet another object of the invention is to provide a shelter in which various movable objects such as wheels, bells and the like can be disposed to be animated by such birds as parakeets, and both the objects and birds be clearly visible from any angle at which they may be observed when the invention is supported on a wall.

A still further object of the invention is to supply a shelter to which access may be easily had when it is supported on a wall, and without removing it therefrom, and one from which the bird droppings can also be removed when the shelter is mounted on the wall.

A further object of the invention is to supply a bird shelter that is adapted to all types of small birds and animals, that provides ample ventilation for the birds or animals contained therein, and is susceptible to being fabricated from a variety of materials that range from spaced wires to transparent sheet material such as glass or clear plastic.

A still further object of the invention is to provide a shelter that is adapted to support a planter on the upper portion thereof in which flowers or plants grow to impart a more natural appearance to the artificial shelter in which the birds are housed.

Still other objects and advantages of the invention will be readily apparent from the following specifications and from the drawings attached hereto in which:

Figure 1 is a perspective view of a preferred form of the invention.

Figure 2 is a sectional view of the preferred form of the invention taken substantially along the line 2—2 of Fig. 1;

Figure 3 is a perspective view of an alternate form of the invention;

Figure 4 is a perspective view of another alternate form of the invention; and

Figure 5 is a partial section of the second alternate form of the invention taken substantially along the line 5—5 of Fig. 4.

The distinctive character of my new bird shelter is clearly depicted in the drawings from which it will be seen that the shelter S is an elongate rectangular structure adapted to be supported from a wall to present a forwardly facing viewing opening O through which the interior of shelter S may be viewed from any portion of the room. Forwardly opening clean-out drawer D is disposed in the lower portion of shelter S to receive debris R dropped from a bird housed in the upper compartment thereof and as barrier means B do not permit the bird to descend into the drawer, such debris will remain in drawer D undisturbed by the bird until cleaned by the user of the invention. Thus it will be evident that the wall supported shelter, because of its great length, provides maximum flying space for the bird which is attractively housed in a perpetually sanitary place of abode, the shelter presenting a striking shadow-box effect.

It will readily be apparent from an inspection of the drawing that my bird shelter may take a variety of forms. In the preferred form of the invention as shown in Figs. 1 and 2, a substantially rectangular enclosure 10 is provided that includes a top member 12 and bottom member 14 that are connected by end pieces 16 and 18. The rear of enclosure 10 is covered by a rear panel 20 of rectangular shape that is affixed by nails, glue or other conventional means to the rearwardly disposed faces of the top and bottom members and end pieces. It is apparent that as the shelter will be supported with the rearward face thereof against a wall, such wall could serve, if desired as a closure in lieu of rear panel 20. However the rear panel is desirable as it provides means to support bird exercise apparatus, as well as lending rigidity to the shelter.

The interior of shelter S is ventilated by means of an elongate rectangular opening 22 that is cut into top member 12 and a plurality of transversely spaced elongate rods 24 extend over said opening to prevent escape of the bird from the shelter. Further means of ventilation are provided by access doors 26 and 28 that are hingedly mounted in door openings 30 and 32 of end walls 16 and 18, respectively. Each of the access doors is a substantially rectangular open frame that supports a plurality of said transversely spaced rods 24 in the opening thereof and each door is provided with a latch 34 and knob 36, as may be seen in Fig. 1.

The forwardly disposed faces of top member 12, bottom member 14 and end pieces 16 and 18 have a substantially rectangular front panel 38 affixed thereto. Front panel 38 has a rectangular shaped lower portion 40 in which an elongate drawer receiving slot 42 is formed. The front panel also includes a top piece 44 and side pieces 46 and 48 which with said lower portion 40 serve to define the viewing opening O that can either be left open or closed by a pane of glass 50, or other transparent material, as shown in Fig. 2. Glass 50 is preferably supported on the inside of front panel 38 by clips 52, or by continuous strips of metal of suitable transverse cross section. If desired, a glass removal slot (not shown) may be cut into one of end walls 16 and 18 to allow glass 50 to be removed.

The interior of shelter S is divided into an upper, larger bird compartment 54 and a lower, smaller drawer compartment 56 by means of a plurality of parallel pegs 58 that protrude horizontally forward to lower portion 40 from rear panel 20 to which they are affixed. Pegs 58 are transversely spaced apart a sufficient distance to permit the falling therethrough of bird droppings, seed, crackers and like debris R that may be dropped by a bird housed in upper compartment 54, but also define a portion of horizontally extending barrier B that prevents the birds obtaining access to the debris which has fallen into the drawer disposed in lower compartment 56. Any equivalent structures could be used in lieu of pegs 58 but the pegs are preferable because they are easily cleaned and they are also desirable as perches for the bird.

Lower compartment 56 is substantially fully occupied by drawer D shown in detail in Fig. 2. The drawer is conventional and may be conveniently fabricated from sheet metal to conform to the dimensions of the lower compartment of shelter S to slidably rest on bottom 14 thereof and is provided with a knob 60 for easy withdrawal. The upwardly facing opening of drawer D removably supports a rectangular wide mesh screen 62 that covers the top of the drawer 44 and can be removed therefrom for cleaning purposes when drawer D is withdrawn from shelter S. Screen 62 and pegs 58 together define said barrier B, the screen being capable of supporting a bird that has descended thereto from the pegs.

When the shelter S is to be used with parakeets it is preferably outfitted with conventional bird exercise and amusement devices such as wheel 64 and ladder pegs 66 that protrude forwardly from rear panel 20 to which they are attached, and swing 68 and bells 70 that are freely suspended from top member 12. Also provided are a water tower 72 removably fastened to the interior of the shelter adjacent one of its access doors and food tower 74 removably fastened to the interior of the shelter adjacent the other of its access doors.

The shelter has means whereby it is supported from a wall, such as tabs 76 and 78 that are affixed to the upper rear side of shelter S by screws 80. Each of the tabs has a hole 82 in the portion thereof that protrudes upwardly above the top 12 of shelter S whereby the invention may be hung in a conventional manner from any selected wall.

As is evident from the foregoing description shelter S is easily maintainable in a sanitary condition and will provide a comfortable, healthy abode for a bird without any danger of contact between the bird and debris R which has fallen into drawer D. Consequently the bird will not become soiled in its own waste and as its activity is limited to upper compartment 54, it cannot disturb the contents of drawer D, which may be removed for cleaning at appropriate intervals. Even with the drawer removed, bottom 14 of shelter S prevents any debris from falling to the floor, which occurrence in the past has been a universal experience of bird owners at times of cage cleaning.

As a consequence of the fact that the invention does not permit the inadvertent displacement therefrom of any debris R, it has many advantages in use. Shelter S may be suspended from any desired wall of any room without consideration of the nature of the room. Experience has shown that it may with perfect safety be hung from a kitchen wall without any danger of having the sanitary condition of the kitchen disturbed. When shelter S has been placed in the desired position, preferably with the upper compartment thereof at eye level, its access doors and drawer are within convenient reach so that food and water may easily be supplied to the bird therein as needed and drawer D removed at periodic intervals for cleansing. The relatively great length of shelter S gives its captive maximum flying space and exercise room, while the presence of barrier B insures that the birds activity does not entail any danger that the area of the room adjacent the shelter will be spattered by debris of any nature.

The invention may also take the form of shelter S' shown in Fig. 3 in which the opening O' has fixed therein a plurality of vertically extending transversely spaced rods 24', rather than a transparent member such as is shown in the preferred form of the invention. As the viewing opening O' provides ample ventilation for shelter S', the rectangular enclosure member 10' need not be provided with air passage means therethrough and the access door 84 in end 16' may also be impervious. In all other significant respects, the shelter S' is identical to the previously described structure of shelter S.

The invention is not only adapted for its normal use, but may also be adapted to have a planter for flowers, vines or the like formed as part of the upper portion thereof. This alternative shelter S'' shown in Figs. 4 and 5, is similar to shelter S of Figs. 1 and 2 in all significant respects, except as noted here, and in use presents a viewer with a scene suggestive of the natural environment of the bird sheltered therein.

The shelter S'' of Figs. 4 and 5 has an enclosure 10'' in which the top 12'' thereof is recessed lower than the upper edges of front panel 38'' and rear panel 20'' in order to define a recess 86 that receives a planter box 88 adapted to rest therein as can be seen in Fig. 5. One end wall 16'' of enclosure 10'' has a rectangular ventilation opening 90 therein over which extend a plurality of vertically extending parallel rods 24''. Opening O'' on front panel 38'' is covered by a glass panel door 92 that is hingedly mounted in said opening for access to the interior of shelter S''.

Each of the alternative forms of the invention provides the same advantages in use as the preferred form.

The invention is not limited to the embodiments thereof hereinbefore described and illustrated in the accompanying drawings but it may be embodied in various other forms within the nature of the invention as it is defined in the following claims.

The invention claimed is:

1. A bird shelter adapted to be removably affixed to a vertical wall surface, including: a drawer adapted to receive excrement of birds disposed in said shelter; an elongate rectangular frame defined by two vertical end pieces that are rigidly connected by a horizontal top piece and a horizontal lower portion in which said drawer is slidably mounted; means disposed in the forward portion of said frame that permit the interior of said frame to be viewed but prevent the escape of said birds therefrom; a plurality of parallel spaced pegs disposed above said drawer that divide said frame into upper and lower compartments, which pegs are spaced sufficiently close together that said birds cannot move downwardly therebetween to escape from said shelter when said drawer is removed therefrom; a rigid rectangular panel extending across the rearward portion of said frame, to which panel said frame is rigidly affixed, with said panel also serving to support said pegs in said spaced relationship; and means to removably support said panel from said wall surface.

2. A shelter as defined in claim 1 in which at least one of said end pieces has an opening formed therein in which a door is provided that is hinged to said opening-defining end piece to close said opening except for access to the confines of said shelter.

3. A shelter as defined in claim 1 in which said top piece has an opening defined therein, and a plurality of spaced members are provided that extend across said opening in said top piece to prevent escape of said birds therethrough, which members are rigidly affixed to said top piece.

4. A shelter as defined in claim 1 in which said means is a sheet of transparent material.

5. A shelter as defined in claim 1 in which said means is a plurality of parallel spaced bars affixed to said frames.

6. A shelter as defined in claim 1 in which at least one of said end pieces has an opening formed therein and a plurality of spaced bars are provided that extend across said opening to prevent escape of said birds therethrough.

References Cited in the file of this patent

UNITED STATES PATENTS

| 747,494 | Smith | Dec. 22, 1903 |
| 1,815,467 | Craig | July 21, 1931 |

FOREIGN PATENTS

| 270,969 | Germany | Feb. 27, 1914 |

OTHER REFERENCES

Page 287 of the periodical "Popular Mechanics" for February 1939.